United States Patent [19]
Yarnall, Jr. et al.

[11] Patent Number: 5,565,850
[45] Date of Patent: Oct. 15, 1996

[54] ELECTRONIC CONFINEMENT SYSTEM FOR ANIMALS USING MODULATED RADIO WAVES

[76] Inventors: Robert G. Yarnall, Jr.; Robert G. Yarnall, Sr., both of Ford Rd., P.O. Box 758, Kimberton, Pa. 19442

[21] Appl. No.: 414,912

[22] Filed: Mar. 31, 1995

Related U.S. Application Data

[63] Continuation-in-part of Ser. No. 286,668, Aug. 5, 1994.

[51] Int. Cl.$^6$ .................................................. G08B 23/00
[52] U.S. Cl. ..................... 340/573; 119/721; 340/636; 340/539; 343/700 R; 455/95
[58] Field of Search .................................. 340/573, 636, 340/539; 119/721; 343/703, 718, 700 R; 342/42, 51; 381/110, 122; 455/95, 100, 89, 90, 128

[56] References Cited

U.S. PATENT DOCUMENTS

| | | | |
|---|---|---|---|
| 4,208,658 | 6/1980 | Fujiki et al. | 342/70 |
| 4,225,206 | 9/1980 | Roman, Jr. | 439/274 |
| 4,229,724 | 10/1980 | Marcus | 340/988 |
| 4,242,668 | 12/1980 | Herzog | 340/539 |
| 4,297,684 | 10/1981 | Butter | 340/557 |
| 4,371,934 | 2/1983 | Wahl et al. | 364/444 |
| 4,480,310 | 10/1984 | Alvarez | 340/988 X |
| 4,656,476 | 4/1987 | Tavtigian | 340/539 X |
| 4,733,633 | 3/1988 | Yarnall, Sr. et al. | 340/573 X |
| 4,745,882 | 5/1988 | Yarnall, Sr. et al. | 340/573 X |
| 4,898,120 | 2/1990 | Brose | 340/573 X |
| 4,967,695 | 11/1990 | Giunta | 119/721 |
| 4,996,945 | 3/1991 | Dix, Jr. | 119/721 |
| 5,067,441 | 11/1991 | Weinstein | 340/573 X |
| 5,121,711 | 6/1992 | Aine | 340/573 X |
| 5,170,149 | 12/1992 | Yarnall, Sr. et al. | 340/573 |
| 5,241,923 | 9/1993 | Janning | 340/573 X |
| 5,266,944 | 11/1993 | Carroll et al. | 340/573 X |
| 5,460,124 | 10/1995 | Grimsley et al. | 119/721 |

OTHER PUBLICATIONS

Operation Manual and Training Guide, 1991, Cover Sheet and p. 5.

*Primary Examiner*—Thomas Mullen
*Attorney, Agent, or Firm*—Ratner & Prestia

[57] ABSTRACT

An animal confinement arrangement including a home base for transmitting a modulated signal and a receiver for receiving the modulated signal. The received modulated signal is demodulated using a demodulator. The demodulated signal is compared to a reference signal to produce a comparator signal indicating if the received modulated signal was transmitted by the home base. Also provided is variable sensitivity deterrent circuitry which is responsive to a strength level of the received modulated signal and to the comparator signal for producing a variable deterrent signal which is applied to an animal if the comparator signal indicates that the received modulated signal was transmitted by the home base. Communication circuitry and an antenna design allow the user to communicate with the animal. A low battery strength indicator for the battery in the receiver is also provided.

39 Claims, 5 Drawing Sheets

ELECTRONIC CONFINEMENT SYSTEM FOR ANIMALS USING MODULATED RADIO WAVES

This patent application is a continuation-in-part application of parent application Ser. No. 08/286,668 filed on Aug. 5, 1994.

FIELD OF THE INVENTION

This invention relates to an electronic confinement arrangement for animals, and more particularly to a wire fence confinement arrangement which utilizes a boundary antenna to transmit a modulated signal to activate a receiver positioned on an animal.

BACKGROUND OF THE INVENTION

One system for accomplishing the confinement of an animal is disclosed in U.S. Pat. No. 5,170,149 entitled CONFINEMENT ARRANGEMENT FOR ANIMALS and issued to Yarnall, Sr. et al. This and other conventional systems mount a receiver on a collar. The collar delivers a shock to an animal wearing the collar when the animal is in relatively close proximity to a perimeter antenna wire. The conventional systems are unintentionally activated, however, by common and naturally occurring sources of unmodulated radio frequencies. These sources include, for example, lightning and household electrical motors such as those motors used in hair dryers and blenders.

Another exemplary conventional system is described in U.S. Pat. No. 4,898,120 entitled ANIMAL TRAINING AND RESTRAINING SYSTEM and issued to Brose. The '120 patent describes a system which includes a transmitter/receiver mounted on an animal's collar for transmitting a series of pulses. A control unit receives the transmitted pulses and provides them to an analog-to-digital (A/D) converter for converting the transmitted pules to digital form based on the amplitude of the received pulses. A central processing unit (CPU) in the control unit uses the digital signals to define the average strength of the transmitted pulses to ascertain if the animal has approached a predetermined distance from the transmitter. The system does not distinguish the transmitted signal, however, from naturally occurring and common sources of unmodulated radio frequencies.

Another exemplary conventional system is described in U.S. Pat. No. 4,967,695 entitled SYSTEM FOR CONTROLLING THE MOVEMENT OF AN ANIMAL and issued to Giunta. The '695 patent describes a confinement system which uses three separate antennas to overcome the problem of a temporary loss of signal when the animal changes direction of travel. The three separate antennas are linked to three individual measuring circuits, which are then connected to a comparator circuit that is linked to a switch circuit. The system has a comparator circuit and a large number of antennas and measuring circuits—all of which must fit inside the animal's receiver unit. These components may increase the size of the receiver unit. In addition, there is an increased drain on the battery used to power the receiver because of the increased number of electronic components that are located in the animal's collar unit. Finally, the manufacturing cost of the animal's receiver unit may be increased.

The foregoing illustrates the limitations known to exist in present confinement systems. Thus, it is apparent that it would be advantageous to provide an alternative confinement system which will account for common and naturally occurring sources of unmodulated radio frequencies and will include an animal's receiver unit that can overcome temporary loss of signal without requiring extensive additional circuitry. Accordingly, these are the principal objects of the present invention.

SUMMARY OF THE INVENTION

To achieve these and other objects, and in view of its purposes, the present invention provides an animal confinement arrangement including a home base for transmitting a modulated signal and a receiver for receiving the modulated signal. The received modulated signal is demodulated using a demodulator. The demodulated signal is compared to a reference signal to produce a comparator signal indicating whether the received modulated signal was transmitted by the home base. Also provided is deterrent circuitry which is responsive to a strength level of the received modulated signal and to the comparator signal for producing a deterrent signal. The deterrent signal is applied to an animal if the comparator signal indicates that the received modulated signal was transmitted by the home base.

In another exemplary aspect of the present invention, a confinement arrangement including a home base transmitter for transmitting modulated signals is provided. A first wire defines a confinement area and receives and emits a first modulated signal. A second wire within the confinement area and adjacent to the home base receives and emits a second modulated signal. A receiver attached to an animal detects a first, low strength level of the first modulated signal from the first wire and activates deterrent devices on the collar. If the animal continues toward the first wire, the receiver also detects a second, higher strength level of the first modulated signal from the first wire and activates an alarm signal to the home base and disconnects the deterrent circuits. If the animal approaches the second wire, the receiver detects the second modulated signal and reactivates the deterrent circuits, thereby reconfining the animal.

In another exemplary aspect of the present invention, an adjustable signal detection circuit and an adjustable spike out circuit are provided in the animal's receiver. The adjustable signal detection circuit permits the sensitivity of the receiver to be adjusted to activate the deterrent circuits at different distances from the first wire. The level of the deterrent is also adjustable to provide varying degrees of deterrence.

In still another exemplary aspect of the present invention, a portable collar communicator is included in the receiver mounted on the animal's collar. The animal's owner is able to communicate with the animal via a microphone positioned at the home base or through a portable unit. The output of the microphone is converted, amplified, combined with a modulated frequency, and then transmitted to the animal's receiver. In response to detection of the owner's modulated voice signal, a collar communicator circuit in the receiver converts the transmitted voice signal so the animal can hear the owner's transmitted voice. The collar communicator circuit includes a power saver circuit permitting use of the collar communicator circuit without consuming excessive energy from the receiver's power supply.

In another exemplary aspect of the present invention, the animal's receiver includes an antenna for detecting the modulated signals from the first wire and the second wire. The antenna includes a ferrite core with four protruding legs arranged at an angle of substantially 45 degrees to each other. Each of the four legs are wound with a continuous length of wire. The antenna improves reception when the animal is in full, unrestrained motion.

In another exemplary aspect of the present invention, a low battery strength level indicator is provided. When the intensity of a signal received from the collar unit falls below a predetermined value, an indicator warns the owner of an imminent power failure of the receiver mounted on the animal's collar. The system also includes a number of low battery indicators positioned at the base station which are responsive to different modulated signals transmitted by animal receivers. Each animal receiver transmits respectively different modulated signals indicative of a low battery level for the different receivers.

The foregoing and other aspects of the present invention will become apparent from the following detailed description of the invention when considered in conjunction with the accompanying drawing.

DESCRIPTION OF PREFERRED EMBODIMENTS AND BEST MODE

In general terms, the confinement system for animals of the present invention operates by transmitting a first, predetermined modulated signal to a receiver mounted on an animal's collar. The modulated signal is demodulated by the receiver and compared to a reference signal. If the demodulated and reference signals are similar, then the signal strength of the first signal is used to determine whether the animal is close to a boundary area. If the modulated and reference signals are not similar, the first signal is ignored.

Figure 1:
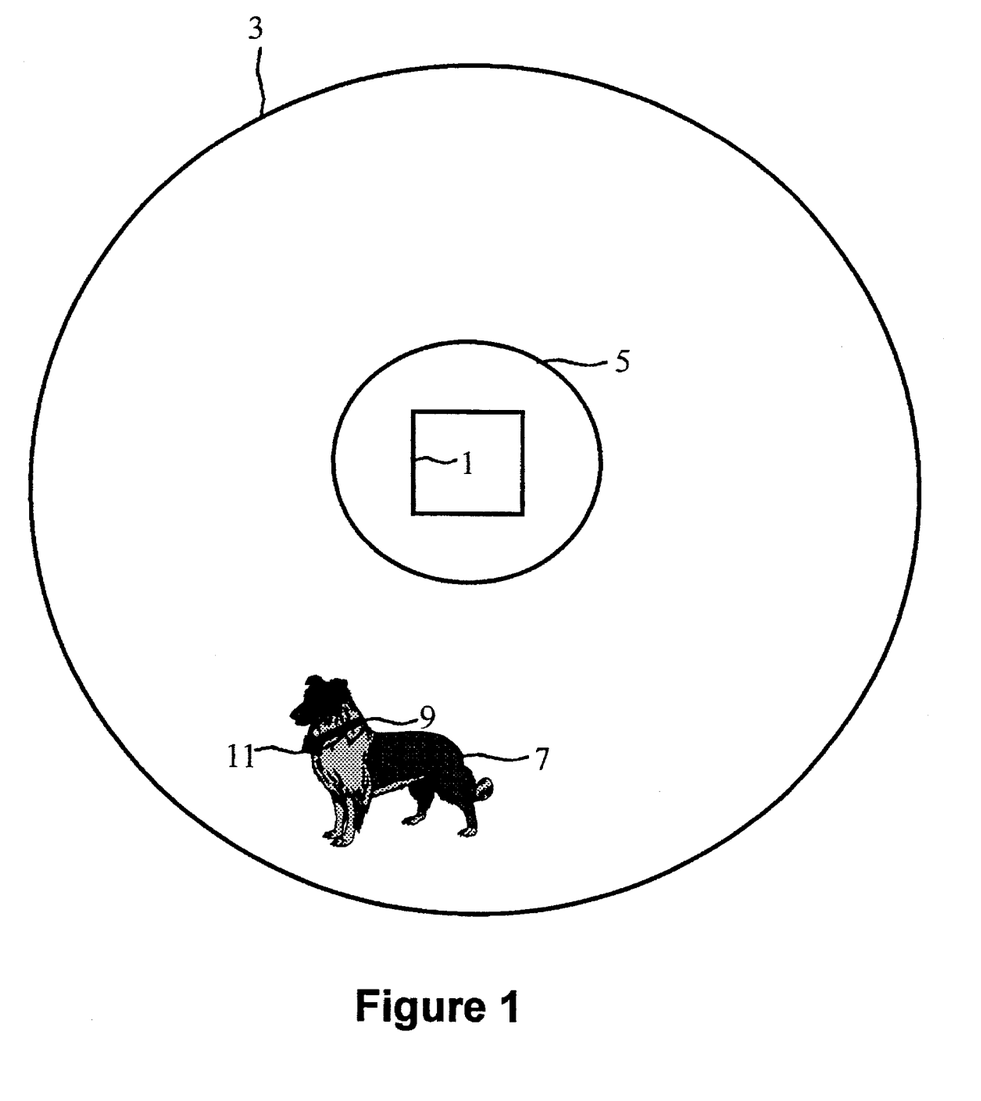
FIG. 1 is a schematic illustration of an exemplary confinement system in accordance with the present invention.

Referring to FIG. 1, there is shown a home base 1 which includes a transmitter for transmitting a first, predetermined modulated signal (A) and a second, predetermined modulated signal (B) which is different from the first, predetermined modulated signal (A). A first signal-emitting wire 3 responsive to the first signal (A) is disposed around a confinement area. Wire 3 can be above ground or buried under ground.

A second signal-emitting wire 5, responsive to the second signal (B), is disposed within the confinement area around home base 1. Wire 5 can circle home base 1 or be positioned adjacent to home base 1. Wire 5 can be above ground or buried under ground.

An animal 7 to be kept within the confinement area wears a collar 9 that carries a receiver 11. Receiver 11 is responsive to the first and second signals (A) and (B). First signal (A) is broadcast to wire 3, and is emitted therefrom. The strength of the emitted signal varies with the distance from wire 3, as is well known. As the animal 7 approaches wire 3, the strength of the signal continuously increases and as the animal 7 departs from wire 3 the strength of the signal decreases. Receiver 11 has a deterrent circuit responsive to a first level of strength of signal (A), preferably between 0.001 and 0.005 watts. Once the first level of strength of signal (A) is detected, the deterrent circuit produces a deterrent, including electrical shock and audio, which both act upon the animal to, it is hoped, drive the animal back toward the center of the confinement area.

If the animal 7 ignores the deterrent and continues toward wire 3, the receiver 11 activates its alarm and disconnect circuit. The alarm and disconnect circuit are responsive to a second level of strength of first signal (A), preferably 0.01 to 0.05 watts. After the second strength level of first signal (A) is detected, the disconnect and alarm circuit disconnects the deterrent circuit, so that the animal 7 no longer receives the deterrent, and it may wander outside the confinement area. The term "disconnect" herein refers to an electrical deactivation. Simultaneously with the disconnect, the collar alarm broadcasts an alarm activation signal back to the home base 1, warning the owner that the animal 7 has ignored the deterrent and is escaping.

After the animal 7 escapes, it may desire to return to the home base 1 or to the confinement area, due to habit or due to action of the owner. Collar 9 carries a reconnect circuit responsive to second signal (B). Once the animal 7 approaches wire 5, the reconnect circuit reactivates the disconnected deterrent circuit, and the animal 7 is reconfined.

Figure 2:
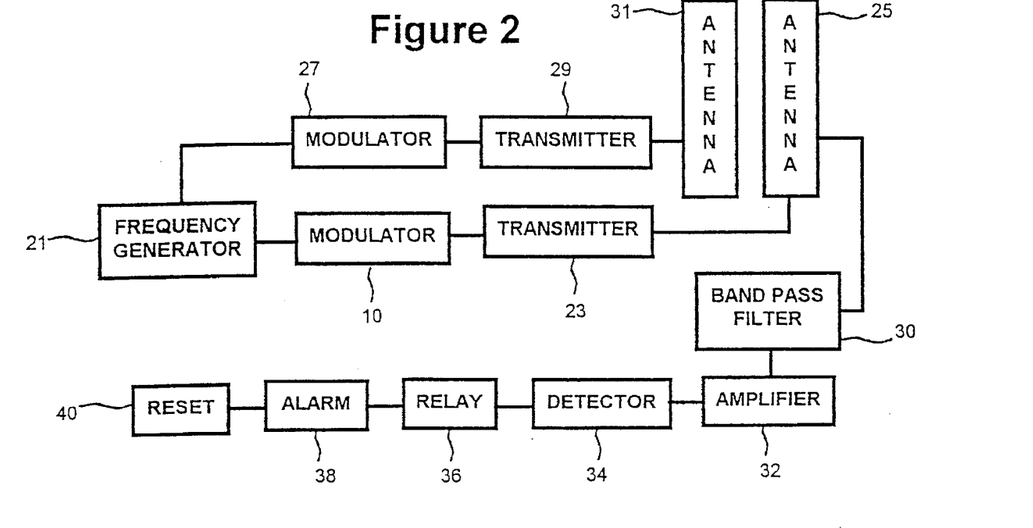
FIG. 2 is an exemplary circuit of a home base transmitter and alarm circuit in accordance with the present invention.

Referring to FIG. 2, an exemplary circuit for home base 1 is shown. The home base is powered by DC electricity. Home base 1 includes frequency generator 21 which generates an oscillating signal of predetermined frequency, for example, 30 KHz. A portion of the output of frequency generator 21 is directed to modulator 27, which shapes the curve of second signal (B), preferably to a square shape, as is well known. Second signal (B) is then transmitted by second transmitter 29 to antenna 31, also referred to herein as wire 5. Wire 5 then emits second signal (B), which is received and processed by the receiver 11 in collar 9, as hereinafter described.

Wire 3 emits first signal (A) which is received and processed by the receiver 11 in collar 9. First signal (A) is a modulated signal which is generated by modulating a carrier signal, for example, the output signal of the frequency generator 21, with a modulating signal which is, for example, an analog signal or a digital signal. Modulated first signal (A) is generated by modulator 10. Modulated first signal (A) is then transmitted by first transmitter 23 to antenna 25, also referred to herein as wire 3.

As is described later, the modulated signal is demodulated by a demodulator in the receiver 11 in collar 9 and compared to a reference signal to determine if the signal received by the receiver 11 in collar 9 has been transmitted from wire 3. As a result, the receiver 11 in collar 9 can prevent inadvertent activation of the deterrent circuit caused by radio waves generated by common and natural sources as well as signals generated by other confinement systems which are received by receiver 11 in collar 9.

Antenna 25 is also used to receive an alarm activation signal broadcast by the collar alarm to warn the owner that the animal has ignored the deterrent and is escaping. This alarm signal passes through a band pass filter 30 that only allows certain frequency signals to pass. The output signal of band pass filter 30 is provided to amplifier 32 which amplifies the signal. Detector 34 is activated by a signal of a certain signal strength. The output of detector 34 is coupled to relay 36, which is, in turn, coupled to alarm 38. The alarm 38 is activated to warn the owner of the escaping animal. The alarm may then be reset using reset circuit 40.

Modulator 10 can modulate signal (A) using a variety of modulation techniques including, for example, amplitude modulation, frequency modulation, pulse modulation and phase modulation, as are known.

First and second transmitters, 23 and 29, each have means for increasing or decreasing the signal strength, so as to increase the size of the field of transmitted and emitted signals, as is well known.

Figure 3:
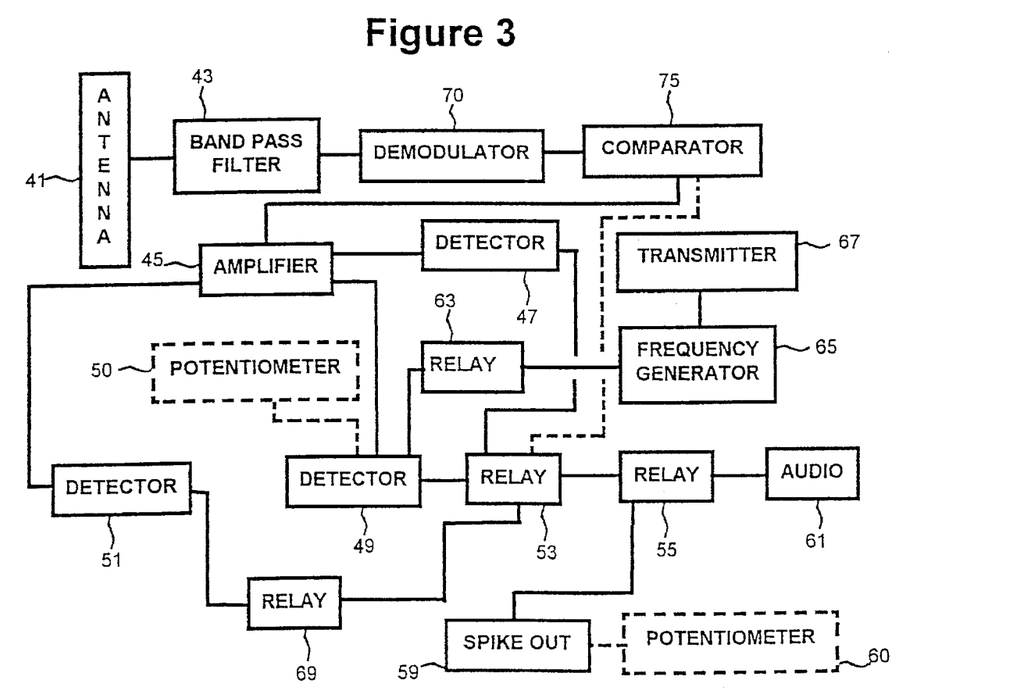
FIG. 3 is an exemplary circuit for a receiver with a deterrent circuit, an alarm circuit, and a deterrent control circuit in accordance with the present invention.

Referring to FIG. 3, an exemplary circuit for the receiver 11 in collar 9 is shown. As the animal 7 nears wire 3, the first strength level signal of modulated first signal (A) is detected by antenna 41 in receiver 11 in collar 9. First signal (A) passes through a band pass filter 43 that allows only the pre-designated frequency of 30 KHz to pass or frequencies around the pre-designated frequency of 30 KHz to pass. Depending on the selected modulation technique, the frequency of first signal (A) may vary. Accordingly, the band pass filter will be selected to pass frequencies which include the frequency or frequency range of first signal (A).

The output signal of band pass filter 43 is provided to (1) demodulator 70 which demodulates first signal (A) to extract the modulating signal, and (2) comparator 75. After signal (A) is demodulated, it is provided to comparator 75 which compares the demodulated signal (A) to a reference signal to determine if the demodulated signal is first signal (A) transmitted by wire 3. If the demodulated signal is the correct signal, then comparator 75 provides first signal (A) to amplifier 45.

If the demodulated signal is not the correct signal, then comparator 75 ignores the input signal for a period of time. After the period of time has elapsed, the comparator compares the currently received signal to the reference signal to determine if the correct signal is received.

Amplifier 45 amplifies first signal (A) up to 100 times, so as to energize the remainder of the circuit. The output of amplifier 45 is divided evenly among detectors 47, 49, and 51. Detector 47 is activated only by modulated signal (A) of a signal strength of between 0.001 and 0.005 watts. This signal level is detected when the animal is still some distance from wire 3. Detectors 49 and 51 are not activated by the first strength level of first signal (A). The output of detector 47 is coupled to first relay 53, which is, in turn, coupled to second relay 55.

Second relay 55 activates an electrical spike circuit 59 and an audio signal circuit 61 to produce an electrical shock and a sound unpleasant to the animal. Circuits to produce the electrical shock and audio are well known in the art and are described, for example, in U.S. Pat. No. 4,733,633 entitled ELECTRONIC CONFINEMENT ARRANGEMENT FOR ANIMALS and issued to Yarnall et al., which is incorporated herein by reference.

If animal 7 continues toward wire 3, second strength level of signal (A) is detected by detector 49. Detector 49 is activated only by modulated signal (A) of a signal strength of between 0.01 and 0.05 watts. The output of detector 49 is coupled to third relay 63, which in turn activates frequency generator 65 to broadcast an alarm via transmitter 67 back to home base 1. Frequency generator 65 may be any type of generator capable of generating an oscillating signal at a predetermined frequency, preferably 50 KHz. Detector 49 is also coupled to first relay 53, which then activates second relay 55 to deactivate the electrical and audio circuits, 59 and 61, respectively.

After animal 7 returns to the proximity of second emitting wire 5, detector 51 detects the presence of modulated signal (B). Output of detector 51 acts upon fourth relay 69 to activate first relay 53, which activates the second relay 55, to reactivate the deterrent circuits of electrical shock and audio.

Alternatively, the received signal could be provided directly to amplifier 45. In this case, comparator 75 acts upon the second relay 55 directly or through relay 53 or detector 49 as illustrated by the broken line in FIG. 3, for example, to deactivate the deterrent circuits of electrical shock and audio for a specified period of time if the correct signal is not received.

Although signals (A) and (B) are transmitted at or around 30 KHz, other radio frequencies or bands of frequencies could be used. Likewise, the alarm signal frequency of 50 KHz could be another frequency. Also, while we have disclosed only a single frequency or band of frequencies for signals (A) and (B), a plurality of individual frequencies or bands of frequencies could be transmitted and received, one frequency or frequency band for a different animal, to make the system workable for a plurality of animals.

Referring to FIG. 3, and in particular, to potentiometer 50 and potentiometer 60, another embodiment, containing adjustable signal circuitry and adjustable spike out circuitry, is provided. The potentiometers 50 and 60 enable the user to individually customize an animal's collar detector unit sensitivity. This feature is desirable because some animals, for example trained animals, are less likely to leave the confinement area. In contrast, untrained animals are likely to need increased monitoring and deterrence to prevent the animal from leaving the confinement area. As a result, the owner would desire to lower the unit's sensitivity for a trained animal, while increasing the unit's sensitivity for an untrained animal.

In addition, the amount of spike out deterrent may be varied. As a result, the amount of current applied as a deterrence is variable. For example, dobermans are highly sensitive to electrical shocks. Thus, a lower spike out deterrent provides a suitable deterrent. Alternatively, rottweilers are not deterred by lower spike out levels. Accordingly, an elevated spike out deterrence is desirable. This feature is desirable because some animals need less of a deterrent to be contained within the predetermined confinement area, while some animals need more.

In FIG. 3, potentiometer 50 is coupled to detector 49, thereby allowing the user to increase or decrease the sensitivity of detector 49 to the outer perimeter's deterrent signal. Thus, the user can vary the strength of the modulated signal (A) that is necessary to activate detector 49. Potentiometer 60 is connected to the spike out circuit 59, thereby allowing the user to increase or decrease the level of the spike out deterrent to be sent to the animal. This circuitry may also be used when more than one animal is being contained within the predetermined confinement area.

Figure 4:
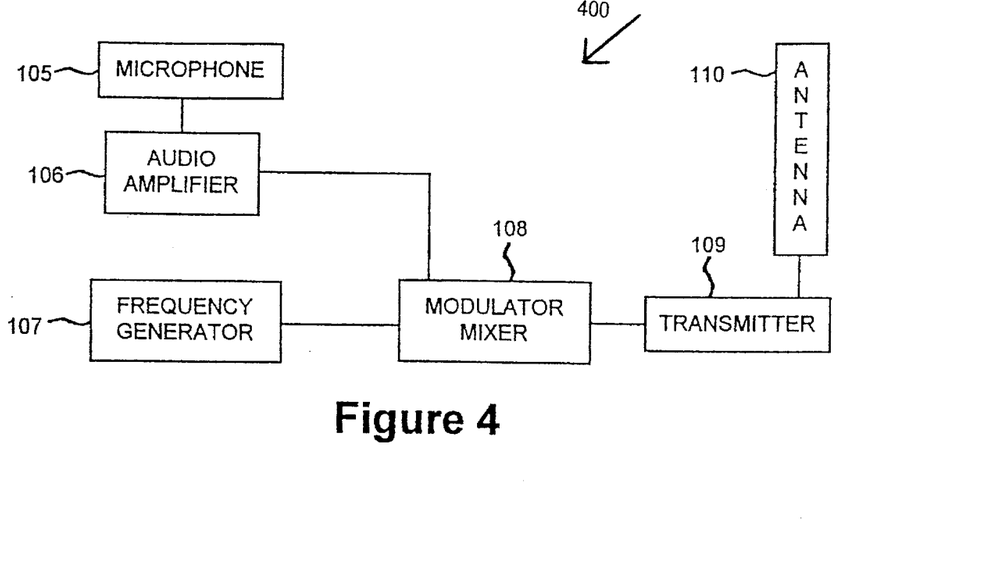
FIG. 4 is an exemplary circuit for a transmitter unit in accordance with an exemplary embodiment of the present invention.

FIG. 4, another exemplary embodiment, contains a collar communicator circuit for allowing the user to communicate with the animal via the receiver mounted on the animal's collar unit. This embodiment enables the animal's owner to communicate with the animal. FIG. 4 may be used as a stand-alone, hand-held unit which is easily transportable or may be integrated into the system of FIG. 2, with frequency generator 107, transmitter 109, and antenna 110 corresponding to frequency generator 21, transmitter 29, and antenna 31. In this arrangement, the modulator 108 mixer is coupled between frequency generator 107 and transmitter 109.

This embodiment is also portable and easily transportable, thereby permitting system mobility. For example, the owner is able to use the system to locate the animal even if the animal is out of range of the predetermined confinement area's antennas because the owner can travel with the transportable system.

FIG. 4 illustrates an embodiment of the transmitter unit 400. The transmitter unit 400 is small enough so that it may be either stationary or portable. The owner speaks directly into a microphone 105. The owner's voice is then electronically converted by the microphone 105 and amplified through an audio amplifier 106, as is well known. Frequency generator 107 creates a predetermined radio frequency (C) (for example, 99.5 KHz). Frequency (C) is modulated and combined with the animal owner's electronically converted voice by a modulator mixer 108. Frequency (C) is then transmitted via a transmitter 109 and an antenna 110 to the receiver 11.

Figure 5:
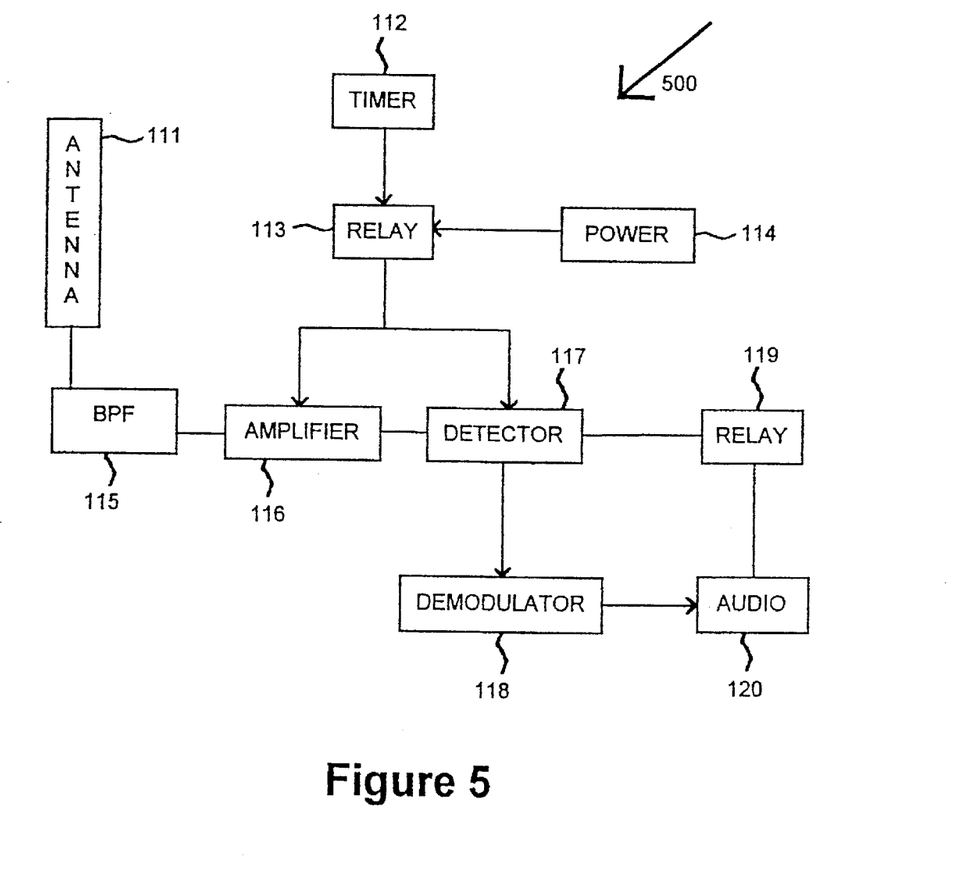
FIG. 5 is an exemplary communicator circuit of a receiver in accordance with an exemplary embodiment of the present invention.

In communicator circuitry 500, located in receiver 11, antenna 111, as shown in FIG. 5, receives all forms of radio signals, including frequency (C) sent from the transmitter unit 400. A timer 112 activates a relay 113 for a fraction of a second at predetermined timed intervals. Because the relay is activated for only a fraction of a second at regular intervals, and is not operating continuously, the battery life of the receiver unit is greatly increased.

The relay 113 allows power 114 to energize the detection circuitry, an amplifier 116 and a detector 117, of the communicator circuitry 500. When frequency (C) has been transmitted, band pass filter 115 allows frequency (C) (here, 99.5 KHz) or frequencies close to frequency (C) to pass through the bandpass filter. The amplifier 116 amplifies frequency (C). In response to the presence of frequency (C), the detector 117 activates a relay 119 to energize audio 120 and demodulator 118, allowing the animal to hear the owner's voice. Antenna 111 may be incorporated as antenna 41 of the collar receiver unit of FIG. 3.

Figure 6:
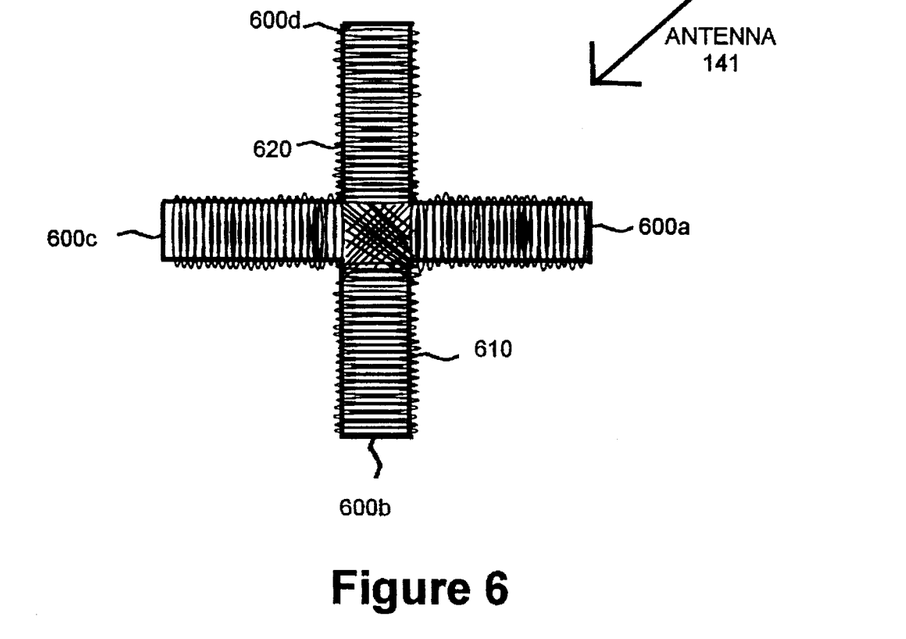
FIG. 6 is a schematic illustration of an exemplary antenna for the confinement system shown in FIG. 1.

FIG. 6 illustrates an exemplary antenna 141 which enables the user to maintain contact continuously with the animal, even when it is in motion and changes direction of travel. The antenna 141 eliminates the need for using multiple measuring circuits and detector circuits. It is a simple but highly functional design allowing the antenna to detect and transmit the required signals when the animal is in full and unrestrained movement.

The antenna 141 is a one-piece component that is comprised of one ferrite core 620 with four protruding legs 600a–600d at 90 degree angles to each other. Each of the four legs are wound with one continuous length of wire 610. The legs 600a–600d of the antenna 141 are two dimensional, laying flat on a single plane. Because only one antenna is used, the size of the animal's receiver 11 is kept small. Furthermore, because no additional components are used, such as measuring circuits and comparator circuits, there is no increased drain on the battery. Finally, manufacturing costs remain low. The antenna 141 may be incorporated as antenna 41 of the collar receiver unit shown in FIG. 3.

Figure 7:
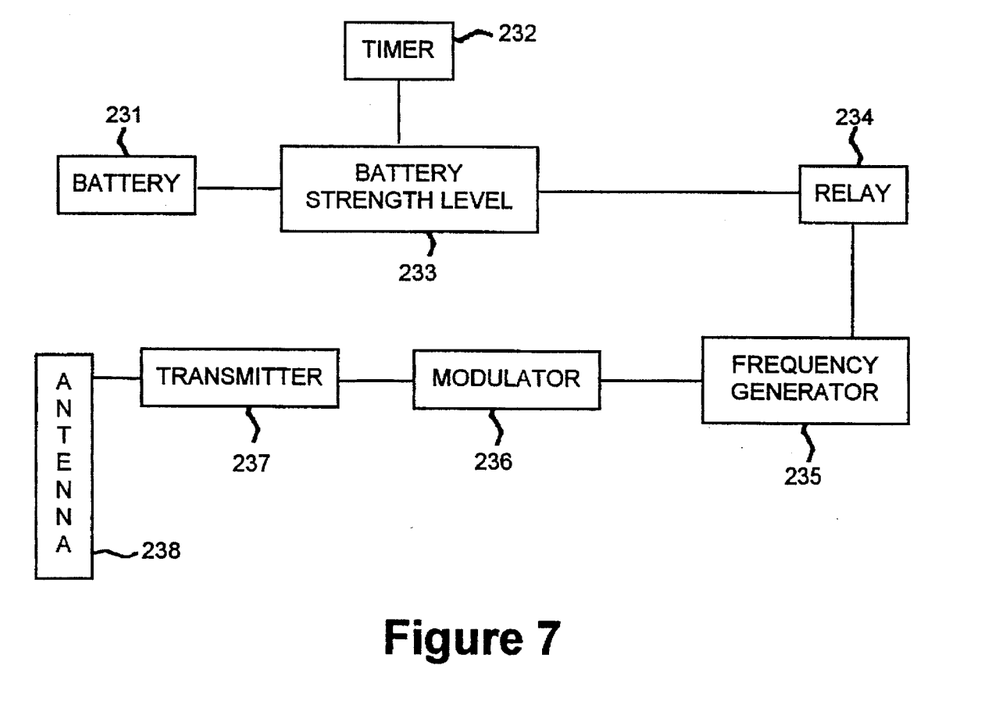
FIG. 7 is an exemplary circuit used in conjunction with the confinement system shown in FIG. 1.

Referring to FIG. 7, another embodiment, containing a low battery strength alarm, is provided. In this embodiment, the current level of the battery 231 in the receiver 11 is checked periodically for a low battery strength level. Either or both of wires 3 and 5 (see FIG. 1) may be used as receiving antenna(s) for receiving a signal (D), the low battery strength indicator signal. Recalling FIG. 1, an animal 7 to be kept within the predefined confinement area, determined by wire 3, wears a collar 9 that carries a receiver 11 for signal (D).

Referring to FIG. 7, a battery strength level indicator 233 measures the current level of battery 231 of the animal's receiver 11. To reduce the energy drainage of this circuit on the battery 231, a timer 232 activates this circuit at predetermined time intervals (for example, once every 4 hours). If the battery strength level indicator 233 reads a low current level from the battery 231, a relay 234 activates a frequency generator 235. The frequency generator 235 generates a low battery strength signal (D). A modulator 236 modulates the low battery strength signal (D) to the predetermined modulation level in accordance with the specific animal's receiver 11. A transmitter 237 transmits the low battery strength signal (D), with its proper modulation levels, through an antenna 238, to be received at the home base 1 by the user.

Figure 8:
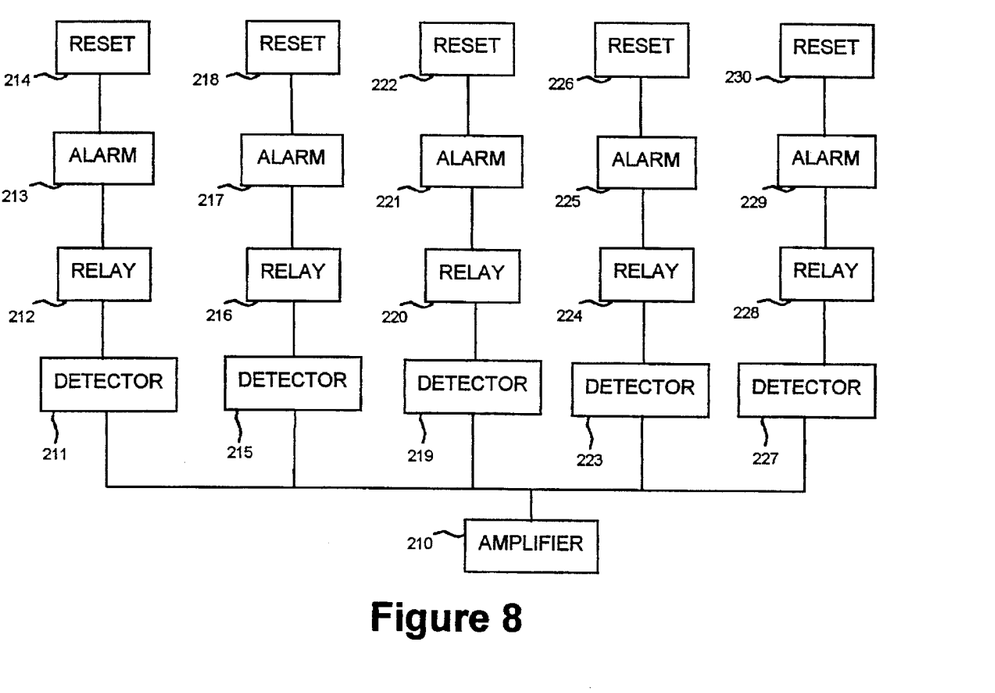
FIG. 8 is an exemplary circuit for determining and transmitting a low battery strength level from the animal's collar in accordance with the present invention.

FIG. 8 is an exemplary circuit for receiving the low battery strength signal (D) at the home base 1. An amplifier 210, which is the same as amplifier 32 in the circuit of FIG. 2, amplifies signal (D) up to 100 times, so as to energize the remainder of the circuit. A detector 211 is only activated by the modulated signal (D). Once the circuit verifies the intensity of signal (D) (a strength of between 0.001 and 0.005 watts) and the predetermined modulation level of signal (D) (between 0.01 KHz and 0.05 KHz), a relay 212 activates an alarm 213 to alert the owner of the low battery level in the animal's receiver 11.

As mentioned above, an aspect of this invention is that it is possible to utilize a configuration capable of indicating the imminent power failure of a particular animal's receiver 11 when more than one animal is confined in the same area. In this arrangement, the low battery strength signal (D) produced by each animal's receiver 11 will have a different level of modulation on signal (D). Whereas the detector 211 is searching for signal (D) with a modulation of between 0.01 KHz and 0.05 KHz, for example, a detector 215 may be searching for signal (D) with a modulation of between 0.06 KHz and 0.1 KHz, a detector 219 may be searching for signal (D) with a modulation of between 0.11 KHz and 0.15 KHz, a detector 223 may be searching for signal (D) with a modulation of between 0.16 KHz and 0.20 KHz, and a detector 227 may be searching for signal (D) with a modulation of between 0.21 KHz and 0.25 KHz.

Alarms 213, 217, 221, 225, and 229 are visible alarms such as light emitting diodes or flashing lights and/or audible alarms such as buzzers or whistles. Resets 214, 218, 222, 226, and 230 allow the user to deactivate the home base 1 alarms and reset the alarm and activate relays 212, 216, 220, 224 and 228 to a normal ready position.

In addition, although we have disclosed only a single modulated signal to be demodulated and compared at the receiver 11 of collar 9 for signal (A) for certain of the aforementioned embodiments, a plurality of modulating signals for modulating the carrier signal could be transmitted in signal (A) or from another confinement system and received, one modulating signal corresponding to a different animal, to make the system workable for a plurality of animals.

Finally, although the detectors are activated by first and second strength levels between 0.001–0.005 and 0.01–0.05 watts, other strength levels could be used.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

In addition, the components illustrated in FIGS. 2–5, 7 and 8 can be implemented in hardware and software which perform the differed operations described in the application. A number of these components can also be integrated in one or more integrated circuits using software. This allows the receiver unit and home base transmitter and alarm circuit to be reduced in size.

What is claimed:

1. An animal confinement arrangement comprising:

home base transmitting means for transmitting a modulated signal from a first signal-emitting wire, the first signal-emitting wire disposed around a confinement area and the modulated signal having a signal strength;

receiver means for receiving the modulated signal, said receiver means having an antenna with a ferrite core having at least four protruding legs and a single length of wire wound around each one of said protruding legs;

demodulator means for demodulating the received modulated signal to produce a demodulated signal;

comparator means for comparing the demodulated signal to a reference signal to determine if the received modulated signal was transmitted from the first signal-emitting wire; and deterrent means, responsive to a strength level of the received modulated signal, for producing a deterrent signal which is applied to the animal if the comparator means determined that the received modulated signal was transmitted from the first signal-emitting wire.

2. The confinement arrangement of claim 1 wherein the modulated signal is one of an amplitude modulation signal, a frequency modulation signal, and a pulse modulation signal.

3. The confinement arrangement of claim 1 wherein:

the home base transmitting means includes means for generating a carrier signal and a modulating signal, the carrier signal modulated by the modulating signal to produce the modulated signal;

the demodulator means demodulates the received modulated signal to extract the modulating signal; and the comparator means compares the extracted modulating signal to the reference signal to produce the comparator signal indicating whether the extracted modulated signal was transmitted by the home base transmitting means.

4. The confinement arrangement of claim 1, wherein the deterrent means further comprises signal variance means for varying the strength level at which the deterrent means applies the deterrent signal.

5. The confinement arrangement of claim 4 wherein the signal variance means is a potentiometer.

6. The confinement arrangement of claim 1 further comprising deterrent variance means for varying the strength of the deterrent signal which is applied to the animal.

7. The confinement arrangement of claim 6 wherein the deterrent variance means is a potentiometer.

8. The confinement arrangement of claim 1, further comprising sound means for transmitting an audio signal to said receiver means, and wherein said receiver means further has:

audio receiving means for converting said audio signal to an audio sound; and timing means for energizing the audio receiving means for a predetermined period of time.

9. The confinement arrangement of claim 8 wherein:

the sound means is disposed in the home base transmitting means, said sound means comprising:
   a) microphone means for converting the audio sound to the audio signal;
   b) modulator means for modulating the audio signal in response to an oscillator output signal to produce the modulated signal; and
   c) transmitter means for transmitting said modulated signal; and wherein the audio receiving means comprises:
   a) an antenna for receiving said modulated signal emitted by said transmitter means;
   b) filtering means responsive to the received signal for eliminating frequencies below a first predetermined frequency and above a second predetermined frequency to produce a filtered signal;
   c) demodulator means for demodulating the filtered signal to produce a demodulated signal;
   d) amplifying means for increasing the signal level of the filtered signal to produce second amplified signal;
   e) detecting means, responsive to a strength level of the second amplified signal, for generating a detector signal;
   f) relay means, responsive to the detector signal, for producing a relay control signal; and
   g) audio speaker means for outputting said amplified signal.

10. The confinement arrangement of claim 9 wherein the timing means energizes the amplifying means and the detecting means for a predetermined period of time.

11. The confinement arrangement of claim 8 wherein the sound means is portable.

12. The confinement arrangement of claim 8 wherein the receiver means includes timing means for energizing the audio receiving means for a predetermined period of time.

13. The confinement arrangement of claim 1 wherein the protruding legs form a cross-shape.

14. An animal confinement arrangement comprising:

home base transmitting means for transmitting a modulated signal from a first signal-emitting wire, the first signal-emitting wire disposed around a confinement area and the modulated signal having a signal strength;

receiver means for receiving the modulated signal and having:
   a) a battery, and
   b) battery strength detection means for detecting a strength level of said battery and transmitting said strength level to said home base transmitting means;

demodulator means for demodulating the received modulated signal to produce a demodulated signal having a second signal strength which corresponds to the first signal strength;

comparator means for comparing the demodulated signal to a reference signal to determine if the received modulated signal was transmitted from the first signal-emitting wire; and deterrent means, responsive to a strength level of the received modulated signal, for producing a deterrent signal which is applied to the animal if the comparator means determined that the received modulated signal was transmitted from the first signal-emitting wire.

15. The confinement arrangement of claim 14 wherein the battery produces a current level and wherein the battery strength detection means comprises:

a) measuring means for measuring the current level of the battery;

b) first relay means, responsive to the current level of said battery, for producing said low battery strength level signal if said current level is below a predetermined current level;

c) oscillator means, responsive to the low battery strength level signal, for generating an oscillating signal of a predetermined frequency;

d) modulator means for modulating said oscillating signal to produce a modulated low battery strength level signal; and e) low battery signal transmitter means for transmitting said modulated low battery strength level signal; and wherein the home base transmitting means further comprises battery alarm means for receiving the low battery strength level signal, said battery alarm means comprising:

a) antenna means for receiving said modulated low battery strength level signal emitted by said receiver means;

b) filtering means responsive to the received signal for receiving signals between a specified frequency range to produce a filtered signal;

c) amplifying means for increasing the signal level of the filtered signal to produce an amplified signal;

d) detecting means, responsive to a first strength level of the amplified signal, for generating a detector signal; and e) second relay means, responsive to the detector signal, for activating and deactivating a low battery strength level alarm.

16. The confinement arrangement of claim 15 wherein the low battery strength level alarm is one of a visible alarm and an audio alarm.

17. The confinement arrangement of claim 14 wherein the battery strength detection means further includes timer means for activating said battery strength detection means at a predetermined time interval.

18. The confinement arrangement of claim 14, wherein the home base transmitting means includes means for activating an alarm in response to the transmitted strength level.

19. The confinement arrangement of claim 18 wherein the battery strength detection means further includes timer means for activating said battery strength detection means at a predetermined time interval.

20. The confinement arrangement of claim 18, wherein the home base transmitting means further includes a plurality of battery alarm means, each one of said plurality of battery alarm means responsive to a respective transmitted battery strength level from a plurality of battery strength detection means located in a plurality of respective receivers on a plurality of animals.

21. An animal confinement arrangement comprising:

a) a first signal-emitting wire disposed around a confinement area;

b) a second signal-emitting wire disposed adjacent to a home base transmitting means, said second signal-emitting wire disposed within the confinement area defined by said first signal-emitting wire;

c) said home base transmitting means for transmitting a first modulated signal from the first signal emitting wire and a second modulated signal different from said first modulated signal from the second signal emitting wire, said home base transmitting means having an alarm which is activated by an alarm activation signal; and d) a receiver responsive to said first modulated signal and said second modulated signal, said receiver including:

(i) deterrent means responsive to a first strength level of said first modulated signal emitted from said first signal-emitting wire for producing as an output a deterrent signal which is applied to the animal, (ii) disconnect and alarm means responsive to a second strength level of said first modulated signal emitted from said first signal-emitting wire, said second strength level being higher than said first strength level, said disconnect and alarm means producing as an output a signal to disconnect said deterrent means and to produce and broadcast to said first signal-emitting wire the alarm activation signal, (iii) reconnect means responsive to said second modulated signal for producing as an output a signal to reconnect said disconnected deterrent means, and (iv) an antenna for receiving and transmitting a plurality of signals, said antenna having a ferrite core with at least four protruding legs and a single length of wire wound around each one of said protruding legs.

22. The confinement arrangement of claim 21 wherein the receiver further includes:

demodulator means for demodulating the received first signal to produce a demodulated signal; and comparator means for comparing the demodulated signal to a reference signal to produce a comparator signal indicating whether the received modulated signal was transmitted by the home base transmitting means;

wherein the deterrent means produces the deterrent signal if the comparator signal indicates that the received modulated signal is transmitted by the home base transmitting means.

23. The confinement arrangement of claim 21 wherein said deterrent means produces an electrical shock as an output deterrent signal.

24. The confinement arrangement of claim 21 wherein said deterrent means produces an audio signal at a predetermined frequency which is unpleasant to the animal as an output deterrent signal.

25. The confinement arrangement of claim 21 wherein said deterrent means produces both an electrical shock and an audio signal at a predetermined frequency which is unpleasant to at least one animal as an output deterrent signal.

26. The confinement arrangement of claim 21 wherein the home base transmitting means includes:

a) oscillator means for generating oscillating signals and for providing an oscillator output signal;

b) modulator means for modulating said oscillator output signal to produce the first modulated signal; and c) transmitter means for transmitting said first modulated signal.

27. The confinement arrangement of claim 21 further comprising signal variance means for varying the sensitivity of the deterrent means to the first strength level.

28. The confinement arrangement of claim 21 further comprising deterrent variance means for varying the strength of the deterrent signal which is applied to the animal.

29. The confinement arrangement of claim 21, further comprising sound means for transmitting an audio signal to said receiver, and wherein said receiver further comprises:

audio receiving means for converting said audio signal to an audio sound; and timing means for energizing the audio receiver means for a predetermined period of time.

30. The confinement arrangement of claim 29 wherein:
the sound means is disposed in the home base transmitting means, said sound means comprising:
a) microphone means for converting the audio sound to the audio signal;
b) modulator means for modulating the audio signal in response to an oscillator output signal to produce a third modulated signal; and
c) transmitter means for transmitting said third modulated signal; and wherein the audio receiving means comprises:
a) an antenna for receiving said third modulated signal emitted by said transmitter means;
b) filtering means responsive to the received signal for receiving signals between a specified frequency range to produce a filtered signal;
c) demodulator means for demodulating the filtered signal to produce a demodulated signal;
d) amplifying means for increasing the signal level of the filtered signal to produce an amplified signal;
e) detecting means, responsive to a strength level of the amplified signal, for generating a detector signal;
f) relay means, responsive to the detector signal, for producing a relay control signal; and
g) audio speaker means for outputting said amplified signal.

31. The confinement arrangement of claim 30 wherein the timing means energizes the amplifying means and the detecting means for the predetermined period of time.

32. The confinement arrangement of claim 29 wherein the receiver includes timing means for energizing the audio receiving means for a predetermined period of time.

33. The confinement arrangement of claim 21 wherein the protruding legs form a cross-shape.

34. An animal confinement arrangement comprising:
a) a first signal-emitting wire disposed around a confinement area;
b) a second signal-emitting wire disposed adjacent to a home base transmitting means, said second signal-emitting wire disposed within the confinement area defined by said first signal-emitting wire;
c) said home base transmitting means for transmitting a first modulated signal from the first signal emitting wire and a second modulated signal different from said first modulated signal from the second signal emitting wire, said home base transmitting means having an alarm which is activated by an alarm activation signal; and
d) a receiver responsive to said first modulated signal and said second modulated signal, said receiver including:
(i) deterrent means responsive to a first strength level of said first modulated signal emitted from said first signal-emitting wire for producing as an output a deterrent signal which is applied to the animal,
(ii) disconnect and alarm means responsive to a second strength level of said first modulated signal emitted from said first signal-emitting wire, said second strength level being higher than said first strength level, said disconnect and alarm means producing as an output a signal to disconnect said deterrent means and to produce and broadcast to said first signal-emitting wire the alarm activation signal,
(iii) reconnect means responsive to said second modulated signal for producing as an output a signal to reconnect said disconnected deterrent means, and
(iv) a battery, and
(v) battery strength detection means for detecting a strength level of said battery and transmitting said strength level to said home base transmitting means.

35. The confinement arrangement of claim 34 wherein the battery produces a current level and wherein the battery strength detection means comprises:
a) measuring means for measuring the current level of the battery;
b) first relay means, responsive to the current level of said battery, for producing said low battery strength level signal if said current level is below a predetermined current level;
c) oscillator means, responsive to the low battery strength level signal, for generating an oscillating signal of a predetermined frequency;
d) modulator means for modulating said oscillating signal to produce a modulated low battery strength level signal; and
e) low battery signal transmitter means for transmitting said modulated low battery strength level signal; and wherein the home base transmitting means includes battery alarm means for receiving the low battery strength level signal, said battery alarm means comprising:
a) antenna means for receiving said modulated low battery strength level signal emitted by said receiver means;
b) filtering means responsive to the received signal for receiving signals between a specified frequency range to produce a filtered signal;
c) amplifying means for increasing the signal level of the filtered signal to produce an amplified signal;
d) detecting means, responsive to a first strength level of the amplified signal, for generating a detector signal; and
e) second relay means, responsive to the detector signal, for activating and deactivating a low battery strength level alarm.

36. The confinement arrangement of claim 35 wherein the low battery strength level alarm is one of a visible alarm and an audio alarm.

37. The confinement arrangement of claim 34 wherein the battery strength detection means further includes timer means for activating said battery strength detection means at a predetermined time interval.

38. The confinement arrangement of claim 34, wherein the home base transmitting means includes means for activating an alarm in response to the transmitted strength level.

39. The confinement arrangement of claim 38, wherein the home base transmitting means further includes a plurality of battery alarm means, each one of said plurality of battery alarm means responsive to a respective transmitted battery strength level from a plurality of battery strength level detection means located in a plurality of respective receivers on a plurality of animals.

* * * * *